(12) United States Patent
Wilsher et al.

(10) Patent No.: US 7,860,348 B2
(45) Date of Patent: Dec. 28, 2010

(54) SYSTEMS AND METHODS FOR IMPROVING IMAGE QUALITY USING DIGITAL SIGNAL PROCESSING TECHNIQUES

(75) Inventors: Michael J. Wilsher, Letchworth Herts (GB); Andre Blaakman, Pittsford, NY (US); Kristy Leeming, Bedfordshire (GB)

(73) Assignee: Xerox Corporation, Norwalk, CT (US)

( * ) Notice: Subject to any disclaimer, the term of this patent is extended or adjusted under 35 U.S.C. 154(b) by 836 days.

(21) Appl. No.: 11/777,341

(22) Filed: Jul. 13, 2007

(65) Prior Publication Data

US 2009/0016649 A1    Jan. 15, 2009

(51) Int. Cl.
*G06K 9/03* (2006.01)
(52) U.S. Cl. .................. 382/309; 382/275; 382/278
(58) Field of Classification Search .............. 382/275, 382/278, 309
See application file for complete search history.

(56) References Cited

U.S. PATENT DOCUMENTS

| 5,570,378 | A | * | 10/1996 | Inoue et al. | 714/785 |
| 5,754,753 | A | * | 5/1998 | Smelser | 714/8 |
| 7,027,521 | B2 | * | 4/2006 | Gueguen | 375/265 |
| 7,596,286 | B2 | * | 9/2009 | Nose et al. | 382/300 |

* cited by examiner

*Primary Examiner*—Yosef Kassa
(74) *Attorney, Agent, or Firm*—Oliff & Berridge, PLC

(57) ABSTRACT

A compensating technique, implemented as an image processing block inserted in a chain of sequential image processing blocks, is used to achieve custom tuning at an end-user site to provide a customer a desired image quality (IQ) different from the factory calibrated one, or to simply compensate for drift in the image quality due to a number of factors including environmental conditions and/or system aging. The compensating techniques use a higher order polynomial to correct an actual input/output parameter relationship such that it is acceptably close to a pre-determined input/output parameter relationship for a given measurable parameter related IQ.

22 Claims, 3 Drawing Sheets

SYSTEMS AND METHODS FOR IMPROVING IMAGE QUALITY USING DIGITAL SIGNAL PROCESSING TECHNIQUES

BACKGROUND

This disclosure is directed to systems and methods using digital signal processing techniques to improve Image Quality (IQ), and/or to modify IQ according to a user's desires or requirements, of an image produced in an image forming device.

IQ for images formed in an image forming device is dependent on a number of complex and varyingly related factors. Principal among these factors is that an output IQ may depend on an ability to accurately reproduce images in accordance with the Tone Reproduction Curve (TRC) for a specific image forming device. It should be appreciated that TRCs involve a measure of the scanning response, the image processing, and the image output terminal (IOT) response for the image forming device. In general, the scanning response for a specific image forming device tends to be very stable. Also, image processing, though capable of being manipulated, tends to be very stable. However, IOT response can deviate during xerographic optimization for a specific device, and will tend to vary across different devices within a family and different families of devices. IOT response may also vary with environmental conditions and with an aging of one or more components of the image forming device. An outcome of all of this is that regardless the inclusion of carefully controlled TRCs across a family of image forming devices, IQ will vary from a typically performing machine.

Conventionally, IQ across a family of machines is reviewed and a center line machine is identified as a typically performing machine and the IQ is optimized on this machine, once the system is stable. Later, any change in IOT response will require that an image processing TRC be compensated by being re-optimized. This process conventionally requires a new version of system software into which the optimization is built. Development and delivery of optimization-adjusted TRCs can prove a significant disadvantage. The process is time consuming, can be expensive, and may be difficult to implement at individual customer or end-user sites. The alternative, however, is that failing to resolve for migration in IOT response over time will result in reduced IQ for the images formed in individual image forming devices.

SUMMARY

In view of the above-identified shortfalls, it may be advantageous to provide a capability by which image processing (or TRC) optimization may be undertaken within an image forming device without requiring that a new version of system software be provided in each case.

The systems and methods according to this disclosure may provide a polynomial correction processing step placed within an image processing system optimization scheme to adjust for small changes in IOT response.

The systems and methods according to this disclosure may provide an accessibility to polynomial correction that may be provided to a customer and/or end-user via some form of non-volatile memory.

The systems and methods according to this disclosure may provide different correction polynomials for each of a plurality of different copy quality modes in an image forming device.

The systems and methods according to this disclosure may provide a polynomial correction between, for example, an image production system (IPS) TRC and an IOT response to effectively modify a TRC curve loaded in the hardware to compensate for changes in the IOT response and to maintain a desired system input to output parameter relationship.

The systems and methods according to this disclosure may provide any order of polynomial correction from a simple first order to a higher order. In practice orders higher than a third order may not be required. This polynomial correction factor is implemented to correct IQ for images output from an image forming device.

The systems and methods according to this disclosure may provide an end-user of an image forming device an ability to slightly modify a TRC to provide custom changes in the IQ of a factory tuned image forming device without compromising a range of allowed image quality/editing adjustments.

The systems and methods according to this disclosure may place an additional processing block that tunes and/or corrects an input/output parameter relationship, for distortion correction, within an IPS optimization chain in an image forming device. The additional processing block may perform the task of higher order polynomial correction. Any changes in the IOT response due to a new build, environmental change or simply drift with time will change the resultant printed image and these changes may be compensated for by this additional processing block based, for example, on a suitable higher order polynomial curve fitting process.

These and other features and advantages of the disclosed systems and methods are described in, or apparent from, the following detailed description of various exemplary embodiments.

BRIEF DESCRIPTION OF THE DRAWINGS

Various exemplary embodiments of disclosed systems and methods for digital error correction in an image forming device will be described, in detail, with reference to the following drawings wherein.

DETAILED DESCRIPTION OF EMBODIMENTS

Figure 1:
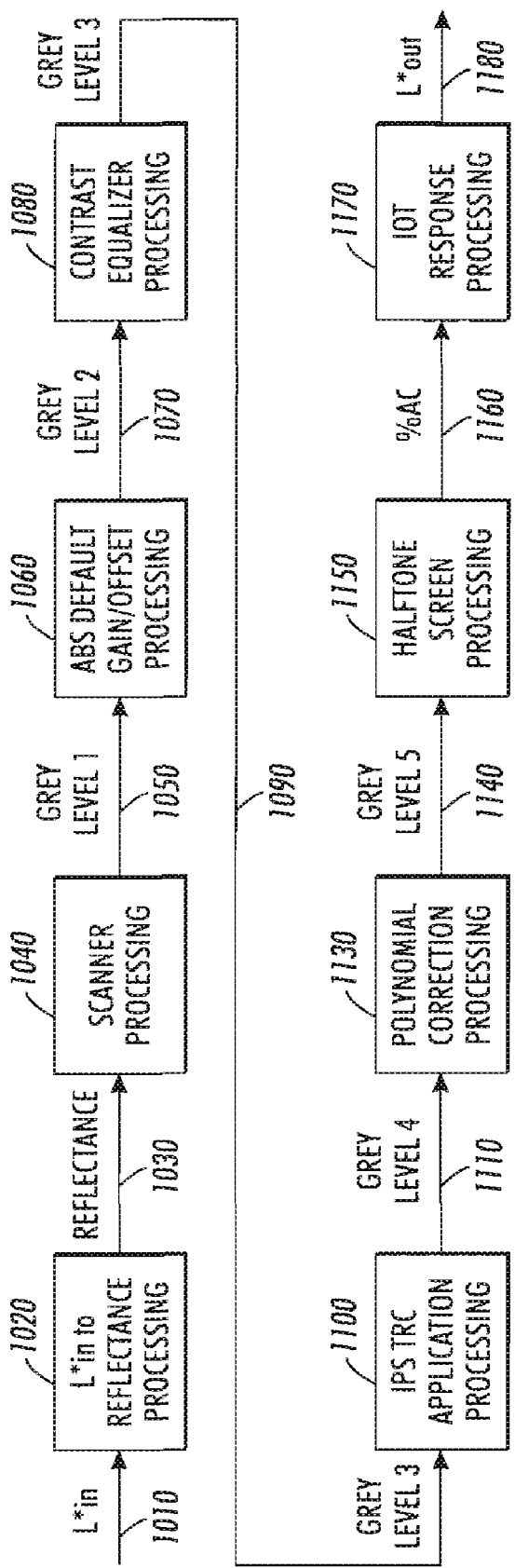
FIG. 1 illustrates a signal processing block diagram in an image forming device modified with an additional processing block for digital correction according to this disclosure.

The following embodiments illustrate examples of systems and method of compensating for image quality (IQ) degradation, or for achieving a certain desired IQ, in an image disposing device using digital correction techniques. The following description of various exemplary embodiments for digital error correction, and specifically for inclusion of a higher order polynomial processing block in an image processing system and/or an image forming device, may refer to one specific type of image forming device, such as, for example, a xerographic image forming device in discussion of various terms related to image correction within such an image forming device for the sake of clarity, and ease of depiction and description. For example, such terms will include reference to Tone Reproduction Curves (TRCs), image output terminals (IOTs) and an image processing system (IPS). It should be recognized that, although the systems and methods according to this disclosure may be applicable to, for example, a digital front end (DFE) in a xerographic image forming device, these depictions and/or descriptions are not intended to be limited to any specific application. Any system and/or method for image forming that may advantageously apply a digital correction technique according to this disclosure is contemplated. In referring to, for example, image forming devices, such devices may include but are not limited to, copiers, printers, scanners, facsimile machines, xerographic image forming devices, and/or any other now known or later-developed system or device for producing, reproducing and/or potentially transmitting or receiving high quality monochrome or color images.

Components used in image forming devices such as, for example, photoreceptors, are manufactured to tolerances that leave their performance characteristics to vary from unit to unit, as well as with changes in environmental conditions like temperature and humidity. Further, image quality variance may occur over time simply based on an aging process of any of the system components. The drift in the quality of an output image may be reasonably compensated for by applying digital compensating techniques such as a higher order polynomial compensating technique, in the IPS.

Other scenarios that may be appropriate for application of the disclosed method may include an ability, based on a customer or end-user requirement to change a machine operating point for a given image forming device by applying disclosed techniques. A shift in the operating point generally requires that a re-calibration, also referred to as a re-characterization, of the image forming device be performed. This process, in general, is very complex and time intensive—often requiring significant down time for the involved device. By applying the systems and methods according to this disclosure, customer service representatives and even users themselves may be able to cut down on the re-characterization process by eliminating and/or replacing many of the steps involved in that process. By applying a correction process in which corrections are performed by application of a higher order polynomial compensating technique such streamlining may be provided.

FIG. 1, illustrates a signal processing block diagram in an image forming device modified with an additional processing block for digital correction according to this disclosure. Shown in FIG. 1 are a sequence of typical individual blocks that represent an order in which an input optical signal, often referred to as a Lightness signal input parameter (L*in) 1010, may be processed in an image forming device. In a first process (a measurement step) 1020, the L*in signal input parameter 1010 may be converted into a reflectance value 1030. The reflectance value 1030 may then in a scanner processing block 1040 be adjusted for a response of the scanner to obtain an output referred to as a first Gray Level (Gray Level 1) 1050.

Succeeding signal processing stages may convert the response into an output parameter with a desired or a predetermined input/output parameter relationship. A next processing block 1060 may perform Automatic Background Suppression (ABS) by applying ABS default gain and offset signals to produce a second Gray Level output (Gray Level 2) 1070. It should be appreciated that the ABS default gain and offset signals are fixed for a given input image and set up in an image forming device.

A contrast equalizer processing block 1080 may then be applied to the Gray Level 2 signal 1070 to produce a third Gray Level (Gray Level 3) 1090. To this equalized and adjusted Gray Level 3 signal 1090, an IPS TRC may be applied in a next processing step 1100 to result in a fourth Gray Level (Gray Level 4) 1110 being produced.

It is at this point in the process where it is envisioned that a polynomial correction processing block 1130 according to this disclosure may be introduced in order to adjust a Gray Level 4 signal 1110 to a fifth Gray Level signal (Gray Level 5) 1140. At this point, the image is still in gray scale format, typically 8 bit data, and can be tone shaped prior to being halftone screened to 1 bit data. This process will be described in greater detail below.

Further processing occurs when the IPS TRC curve having been applied to the signal produces a signal which, as will be discussed below is polynomial corrected, in order to produce a signal to which a halftone response is applied in a next processing step 1150. The halftone response being added in this processing step 1150 results basically in a gray level to area coverage conversion being undertaken. It detects if the background as a whole has a non-white tint and performs the processing such that the resulting background in the output image appears white to basically perform a Gray Level to percentage Area Coverage (% AC) conversion.

The area coverage is then applied to the IOT processing block 1170. The L*out signal (lightness output) 1180 is the desired overall output which is represented in a printed result (a measurement step). The combination of all the processing inclusive of the blocks 1020, 1040, 1060, 1080, 1100, (excluding 1130), 1150 and 1170 produce an overall response, also referred to as an input/output parameter relationship of the image forming device.

The composite processing performed by the ABS default gain/offset processing block 1060, the contrast equalizer processing block 1080, IPS TRC application processing block 1100, and halftone screen processing block 1150 is the portion of the image processing that is considered to remain fairly stable. In other words, once the overall image forming device input/output parameter relationship is set at a predetermined level, the response of each of the processing blocks, except the IOT response processing block 1170, is generally understood to remain stable. However, the IOT block 1170 response can differ from build to build.

In various exemplary embodiments, the systems and methods according to this disclosure may compensate for changes in IOT response, in order to retain the input/output parameter relationship close to that desired. This may be accomplished, as indicated above, by introducing an additional stage of processing to the processing chain discussed above. This new block is shown in FIG. 1 as the polynomial correction processing block 1130. In exemplary embodiments, it may preferably be inserted between the IPS TRC application processing block 1100 and the halftone screen processing block 1150. An objective of such a processing step may be to effectively modify the input/output parameter relationship, so that this relationship compensates for undesired changes in IOT response to maintain the overall input/output parameter relationship acceptably close, i.e., within a desired level of deviation.

Although a third order polynomial may have been found to provide a sufficient amount of polynomial curve fitting to successfully correct most image distortion, proposed systems and methods according to this disclosure are not constrained to any specific order of polynomial attributes. An image forming device may include different modes of operation and the overall input/output parameter relationship may change or drift differently depending on such operating modes. As such, it may be advantageous to provide different sets of polynomials in order to perform the necessary corrections for each of the different operating modes.

Technical experiments were undertaken to gauge the effectiveness of a polynomial-based curve fitting technique in adjusting for deviations in IOT response. A series of IOT curves were taken across numerous machines and necessary adjustments required to bring machines back to a nominal machine IOT response were measured as corresponding TRCs were calculated. A desired pre-determined input/output parameter relationship curve was plotted and an actual input/output parameter relationship curve was overlaid on the desired relationship curve. Deviations in actual response were measured and corrected responses according to several cases of polynomial correction were plotted. An objective of these experiments was to optimize a polynomial correction such that, as a result of the polynomial compensation, the resulting input/output parameter relationship curve would mirror the desired pre-determined input/output parameter relationship curve within an acceptable tolerance.

Experimentally, it was determined that, across all of the machines tested, even a simple slope and offset correction worked quite well, but on some machines a higher order fit, i.e., to a second or third order, produced markedly better results. As a result of this experimentation, it was found that, although even a first order polynomial correction function provides certain advantageous results, a third order polynomial, when implemented, could easily result in tremendously increased image correction. However, implementing lower order correction, however, does produce some changes in output image quality, and does allow extra flexibility in curve fitting any changes which may be required. There is no limitation on either lower or higher order polynomials.

Figure 2:
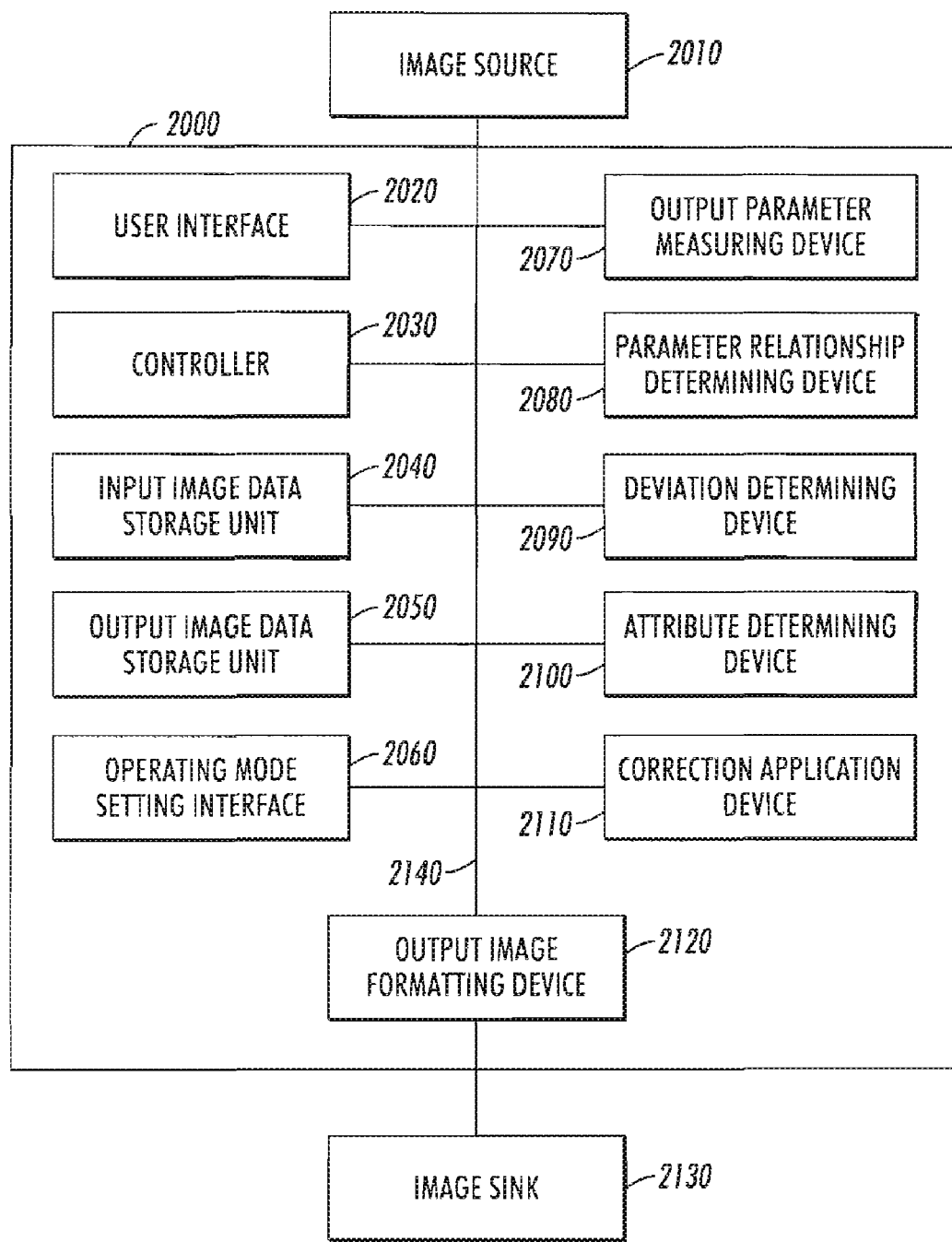
FIG. 2 illustrates a block diagram of an exemplary embodiment of a system for image quality compensation by a higher order polynomial correction, in an image forming device.

FIG. 2 illustrates a block diagram of an exemplary embodiment of a system 2000 for image quality compensation by a higher order polynomial correction, in an image forming device, based on a pre-determined relationship of input/output parameter. As shown in FIG. 2, exemplary system 2000 may include an image source 2010, a user interface 2020, a controller 2030, an input image data storage unit 2040, an output image data storage unit 2050, an operating mode setting interface 2060, an output parameter measuring device 2070, parameter relationship determining device 2080, deviation determining device 2090, an attribute determining device 2100, a correction application device 2110, an output image formatting device 2120 and an image sink 2130, all connected via a data/control bus 2140.

In various exemplary embodiments of disclosed systems and methods, an input image may be obtained via an image source 2010. The image source 2010 may be any form of image receiving unit in an image forming device such as, for example, an image scanning device, an image digital data storage device, a digital still or video camera, and/or a locally or remotely located computer and/or data manipulation workstation, or any other now known or later-developed device that is capable of generating or reproducing electronic digital source image data. The image source 2010 may be integrated with, or connected remotely to, the image forming device. The image source 2010, if a separate device or unit from the image forming device, may be connected to the image forming device by either a direct or network data communication link, including any one or more of a wired, wireless and/or optical link.

It should be appreciated that, although the image forming device with which the system 2000 is associated may be discussed as an electrographic and/or xerographic image forming device for translating image data from an image source to an image sink, this disclosure is not limited to only such an application.

The image source may include a capability to store input image data. Alternatively, the system 2000 may internally store input image data in, for example, an input image data storage unit 2040.

A user interface 2020 may be provided in the form of, for example, a graphical user interface associated with the image forming device, in order, where appropriate, to query a user, and/or receive user input, regarding variable parameters for adjustment of operating parameters within the system 2000 that may facilitate improved image production and/or reproduction.

It should be appreciated that the user interface 2020 may also comprise, for example, a digital data storage medium and compatible digital data storage medium reading device, or, for example, a locally or remotely located computer or other data workstation that may be in data communication with the exemplary image forming device 2000.

A controller 2030 may be provided to control overall operations of the image forming device 2000, or otherwise to specifically control individual functions related to improving image quality, to query databases stored within one or more data storage units, and/or to carry out operations based on determinations made in other units within the device 2000.

An operating mode setting interface 2060 may be provided by which the system 2000 may set any one of a plurality of modes in which the image forming device may be capable of operating. As will be discussed in greater detail below, a higher order polynomial compensating mechanism may use a different set of polynomial attributes, which may include a different polynomial order and different polynomial coefficients, for each of the different operating modes.

Data storage units such as those depicted as an input image data storage unit 2040 and an output image data storage unit 2050 may be provided additionally to store, for example, preset TRCs that the system 2000 may refer to in producing and/or reproducing color images on output image receiving media. Additionally, storage space for other operating parameters of the system 2000 may be provided, such as a database. This database could include certain predetermined higher order polynomial coefficients for compensating image quality of an output image based on a pre-determined input/output parameter relationship of the desired output image in the image forming device with which the system 2000 is associated.

An output parameter measuring device 2070 may be provided to receive input, for example, from a user interface 2020, or to otherwise reference data stored within any manner of data storage unit 2040, 2050 or as may be presented to the system 2000 on some from a non-volatile memory, in order to determine such a range of higher order polynomial attributes for an output image compensation that may affect the quality of an image produced or reproduced by the image forming device.

A parameter relationship determining device 2080 may be provided to determine, based on measured characteristics from other units and/or devices within the system 2000 or otherwise optionally in conjunction with pre-stored or predetermined information regarding input/output parameter relationships of certain signal processing blocks in the complete signal processing chain within the image forming device.

A deviation determining device 2090 may be provided to determine a deviation between the pre-determined input/output parameter relationship and the actually measured input/output parameter relationship. Such a deviation determining device 2090 may be provided to assess any need to invoke a higher order polynomial correction process. Such a determination may be made with respect to evaluating a drift, for example, in IOT response in an image forming device with which the system 2000 is associated. If a determined deviation is not significant enough to warrant using the higher order polynomial correction processing, the implication is that the IQ provided by the image forming device is sufficiently close to a desired quality, or has not drifted sufficiently enough. However, if the deviation is excessive in that, for example, the deviation exceeds a preset threshold, polynomial correction signal processing may be applied to correct for such deviation and to improve image quality. This device may be as simple as a visual inspection, visual comparison against desired/actual or potential results and subsequent manual adjustment of the polynomial parameters, or more complex such as a complete measuring system and mathematical polynomial parameter calculation.

A suitable attribute determining device 4100 may be used to determine the attributes of an appropriate polynomial to be employed to correct the input/output parameter relationship such that the resulting IQ from the image forming device may be acceptably close to a pre-determined, preset or desired IQ. The attributes of the appropriate polynomial consist of a set of numbers, wherein at least one attribute is an integer representing an order of the polynomial and the others are values of coefficients of the polynomial. The operating mode setting interface 2060 may provide data to determine appropriate higher order attributes of such a polynomial since the exact order of the appropriate polynomial, and the coefficients thereof, may actually be different for different operating modes, available through the operating mode setting interface 2060. One important aspect is the entry of a small number of coefficients as opposed to a multi-point correction curve, greatly enhancing the simplicity of the user interface.

A correction application device 2110 may be provided to perform the correction in the input/output parameter relationship by applying a polynomial correction technique to the relationship such that the resulting IQ of the image forming device with which the system 2000 is associated may be acceptably close to the pre-determined IQ.

An output image formatting device 2120 may be provided to produce and/or reproduce output color images based on input images received from the image source 2010 on individual output image receiving media in a format particularly suited to one or more characteristics of the output image receiving media. Such output image formatting may include, for example, formatting a composite image that includes a correction in the output IQ such that said IQ is acceptably close to the pre-determined IQ.

The systems and methods according to this disclosure contemplate an image sink 2130 being an output image receiving medium upon which a hard-copy image may be formed. Other image sinks 2130, however, to include, for example, a digital display for review of a composite image, particularly associated with potential user adjustment of certain operating parameters, may be employed.

Any of the data storage units depicted, or alternatively described above, may be implemented using an appropriate combination of alterable, volatile or non-volatile memory, or non-alterable, or fixed, memory. The alterable memory, whether volatile or non-volatile, may be implemented using any one or more of static or dynamic RAM, or for example, any computer-readable disk type media and compatible disk drive, a hard drive, a flash memory, or any other like memory medium and/or device. Similarly, the non-alterable or fixed memory may be implemented using any one or more ROM, PROM, EPROM, EEPROM, optical ROM disk, such as, for example, CD-ROM or DVD-ROM disk and compatible disk drive, or any other like memory storage medium and/or device.

The computations necessary to find the attributes of the polynomial that does the curve fitting are preferably implemented on a programmed general purpose computer. However, this implementation can also be performed on a special purpose computer, a programmed microprocessor or microcontroller or a programmed Digital Signal Processor, peripheral integrated circuit elements, and ASIC or other integrated circuit, a hardwired electronic or logic circuit such as a discrete element circuit, a programmable logic device such as a PLD, PLA, FGPA or PAL or the like, or even by manual adjustment of the coefficients.

Figure 3:
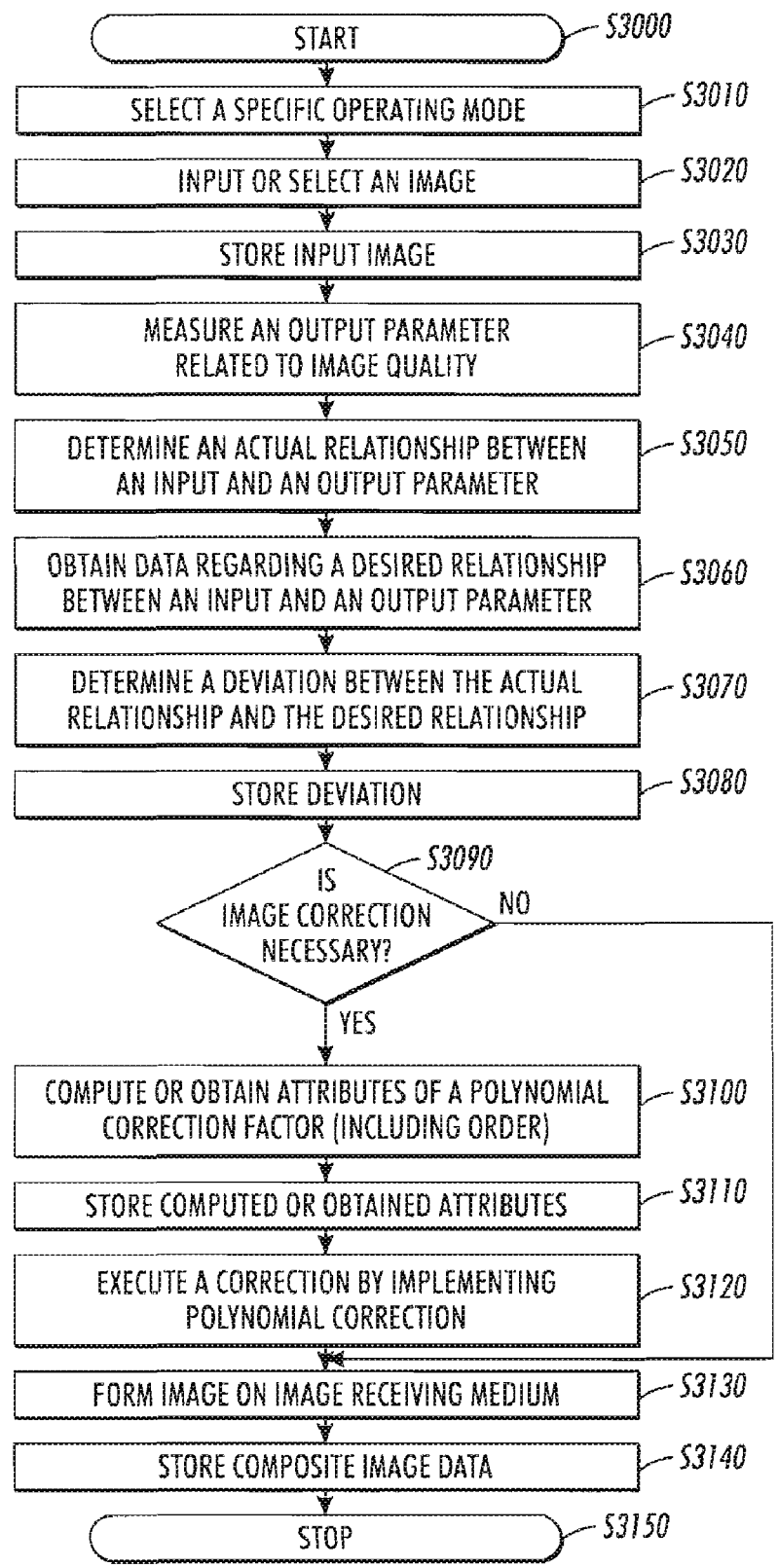
FIG. 3 illustrates a flowchart of an exemplary embodiment of a method for improving image quality in an image forming device using a higher order polynomial correction.

FIG. 3 illustrates a flowchart of an exemplary embodiment of a method for improving image quality in an image forming device using a higher order polynomial correction based on a pre-determined relationship of input/output parameter. As shown in FIG. 3, operation and method commences at step S3000 and proceeds to step S3010.

In step S3010, a specific operating mode may be selected. The image forming device may have several modes of operation to form images on a plurality of output media and/or produce a plurality of image qualities. A deviation in an actual input/output parameter relationship with respect to a predetermined input/output parameter relationship may depend on the operating mode of the image forming device. Attributes of a specific higher order polynomial, which may later be applied for correcting an output image quality, may depend accordingly, among other factors, on the specific operating mode of the device. Operation of the method continues to step S3020.

In step S3020, an input image is obtained. It should be appreciated that the input image may be obtained by being input into the image forming device via, for example, any manner of scanner device associated with the image forming device, either internal to, or in data communication with, the image forming device. Alternatively, the input image may already be stored in, for example, some manner of image production and/or reproduction device such as, for example, a computer or computer workstation connected by a network or other image data exchange pathway with the image forming device, or in a data storage unit in the image forming device itself. Operation of the method continues directly to step S3040 or optionally to step S3030.

In optional step S3030, particularly in a case where an input image is input from, for example, a scanner device in an image forming device, such input image information, or data related to such a scanned input image, may be stored in one or more storage devices located within, or associated with, the image forming device. Storing of an input image may be temporary, such as, for the duration of the image forming operation, or may be longer such that stored input image information may later be accessed to any beneficial purpose. Operation of the method continues to step S3040.

In step S3040, an output parameter related to the image quality is measured. The same output parameter may differ from build to build. Individual constituent components used in an image forming device, such as, for example, lasers and/or photoreceptors, have specifications that vary over a spread of values generally governed by some tolerance. Based on being bounded by a range of parameters, the performance characteristics of such constituent components may then vary from unit to unit. Additionally, drift in certain characteristics may occur with environmental conditions like temperature and humidity, or simply through an aging process of the image forming device. Operation of the method continues to step S3050.

In step S3050, an actual relationship between an input and an output parameter is determined. The input/output parameter relationship may be different from build to build for the same reasons indicated above. For any specific mode of operation, selected among a plurality of available operating modes, the input/output parameter relationship has a desired characteristic that may be pre-determined. Operation of the method continues to step S3060.

In step S3060, data regarding a desired relationship between an input and an output parameter is obtained. Such data may be obtained from, for example, a storage device within the image forming device that stores such data, or otherwise via some user input. The data may be related to one or more of the characteristics of the TRC, and/or IOT response, in the image forming device. Such relationship information between an input and an output parameter, in like manner to the discussion above, may vary from build to build within a family of image forming devices. Operation of the method continues to step S3070.

In step S3070, a deviation between the actual input/output parameter relationship and the desired input/output parameter relationship that is pre-determined is obtained. In a case where generally all of the parameters are stable over time and device, such deviation may be attributable to IOT response having drifted based on the factors discussed above. Operation of the method may continue directly to step S3090 or optionally to step S3080.

In optional step S3080, deviation information, whether sensor obtained, and/or estimated through a computational mechanism, may be optionally stored to any beneficial purpose. Such beneficial purpose may include, but is not limited to, providing, for example, an ability of the image forming device not to require, on a repeated basis, deviation information regarding the specific device to be updated where device characteristics and environmental conditions may remain stable over time. Operation of the method continues to step S3090.

In step S3090, a determination is made whether the deviation between the actual input/output parameter relationship and the desired input/output parameter relationship, which may be pre-determined, pre-stored or otherwise preset, is significant enough to warrant invoking image quality correction such as with application of a higher order polynomial to perform compensation to the actual input/output parameter relationship.

It should be appreciated that the above-discussed determination may be undertaken in any one of many possible ways. Two specific examples regarding implementing the determination, which should not be construed as being limiting in any way, are described. One possibility is to determine that a single largest deviation over an entire range of the input/output parameter exceeds a programmable preset threshold. A second possibility would be to square the deviation, also referred to as an error power between the actual input/output parameter relationship and the desired input/output parameter relationship, arithmetically integrated over an entire range of the input/output parameter to determine that such a squared deviation may exceed a programmable preset threshold.

If, in step S3090, a determination is made that deviation is such that a higher order polynomial correction is not warranted, operation of the method continues directly to step S3130.

If, in step S3090, a determination is made, based on any of the above-identified techniques, or otherwise, that a deviation correction is warranted, or would be beneficial, operation of the method may continue directly to step S3120 or optionally to one of steps S3100 or S3110

In optional step S3100, attributes of higher order polynomial may be obtained and/or computed. Such a process of obtaining attributes may be based on a set of pre-stored parameters regarding the adjustments made in, for example, an operating setting of lightness and/or contrast. The attributes of the appropriate higher order polynomial consist of a set of numbers, of which at least one is an integer representing the order of the polynomial and the others are the values of the coefficients of said polynomial. The obtained or computed attributes may depend on an operating mode since the exact order of the appropriate polynomial and the coefficients thereof may actually be different for different operating modes of the image forming device. Although a polynomial of order three or less may be sufficient to allow a polynomial curve fitting method to be successful in correcting most cases of image distortion the disclosed method is not intended to be limited to any specific range of polynomial attributes.

Regardless of a manner by which higher order polynomial attributes may be computed and/or obtained, an objective of providing such a polynomial correction is to have a post-polynomial corrected operational input/output parameter relationship be acceptably close to the pre-determined input/output parameter relationship to improve image quality. Operation of the method may continue directly to step S3120, or optionally to step S3110.

In optional step S3110, the attributes of the higher order polynomial computed and/or obtained for correcting the input/output parameter relationship to achieve a desired image quality may be stored to some beneficial purpose. Such beneficial purpose may include, for example, establishing, populating and/or updating a database of higher order polynomial attributes that may be provided to correspond to routinely desired output image quality for the specific image forming device or for a specific operating mode of the image forming device. In this regard, based on, for example, an input/output relationship of a current image forming device, the system may automatically query such a database in order to obtain predetermined and/or recently updated higher order polynomial attributes regarding compensating for the deviation from the pre-determined input/output relationship. Operation of the method continues to step S3120.

In step S3120, a polynomial processing function may be implemented in an image output parameter determining processing chain in order that a deviation between the actual input/output parameter relationship and the pre-determined input/output parameter relationship is mitigated to an extent that the resulting input/output parameter relationship, as a consequence of the application of a higher order polynomial correction, is acceptably close to the desired and/or pre-determined input/output parameter relationship. Operation of the method continues to step S3130.

In step S3130, the input and/or stored image obtained in step S3020 above is produced and/or reproduced in a higher order polynomial compensated or non-higher order polynomial compensated manner on an image receiving medium. Operation of the method continues to step S3140.

In step S1340, the input image information and/or composite image information may be optionally stored to one or more beneficial purposes. Such beneficial purposes may include, but are not limited to, automated composite image review in order, for example, to determine and/or update predetermined input/output parameter relationship of overall image processing sequence. Operation of method continues to step S3150 where operation of the method ceases.

It will be appreciated that various of the above-disclosed and other features and function, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

Various change may be made without departing from the spirit and scope of this invention as defined in the following claims.

What is claimed is:

1. A method for modifying an output from an image forming device, comprising:
    measuring an output parameter relating to image quality in an image forming device, the output parameter being related to an input parameter, which is manipulated by the image forming device, according to a predetermined relationship;
    determining an actual relationship between the output parameter and the input parameter; and
    modifying the actual relationship by applying a correction factor based on a polynomial function to the manipulation of the input parameter in the image forming device,
    wherein modifying the actual relationship by applying the correction factor modifies output images produced from the image forming device.

2. The method of claim 1, further comprising:
    assessing a deviation of the actual relationship from the predetermined relationship; and
    determining whether the deviation from the predetermined relationship exceeds a predetermined threshold,
    wherein modifying the actual relationship by applying the correction factor re-establishes the predetermined relationship within acceptable limits.

3. The method of claim 2, wherein modifying the actual relationship by applying the correction factor is undertaken to modify the actual relationship in a manner other than to re-establish the predetermined relationship within acceptable limits.

4. The method of claim 1, wherein the predetermined relationship is based on an operating mode of the image forming device, the method further comprising initially referencing an operating mode of the image forming device to establish the predetermined relationship.

5. The method of claim 4, wherein referencing the operating mode comprises receiving an instruction for a specific operating mode.

6. The method of claim 1, wherein the polynomial function is a higher order polynomial function.

7. The method of claim 6, further comprising pre-storing, in an image forming device, a plurality of sets of polynomial attributes for different higher order polynomial functions including, for each different higher order polynomial function, at least a polynomial order and polynomial coefficients,
    wherein an appropriate set of polynomial attributes is selected as the correction factor.

8. An image forming device including the method of claim 1.

9. A xerographic image forming device including the method of claim 1.

10. A digital data storage medium on which is stored a program for causing a device to implement the method of claim 1.

11. A system for modifying an output from an image forming device, comprising:
    an output parameter measuring device that measures an output parameter related to an input parameter in an image forming device, the output parameter being related to the input parameter according to a predetermined relationship;
    a parameter relationship determining device that determines an actual relationship between the output parameter and the input parameter;
    a correction application device that modifies the actual relationship by applying a correction factor based on a polynomial function to a manipulation of the input parameter in the image forming device; and
    an output image formatting device that outputs a modified output image produced from the image forming device.

12. The system of claim 11, further comprising a deviation determining device that determines a deviation between the actual relationship and the predetermined relationship.

13. The system of claim 12, wherein the deviation determining device determines whether the deviation between the actual relationship and the predetermined relationship exceeds a predetermined threshold.

14. The system of claim 13, wherein the correction application device applies the correction factor only when the deviation is determined to exceed the predetermined threshold, and the application of the correction factor re-establishes the predetermined relationship within acceptable limits.

15. The system of claim 11, wherein the correction application device applies the correction factor according to a user input to modify the actual relationship to deviate from the predetermined relationship according to the user's desires.

16. The system of claim 11, further comprising an operating mode setting interface for at least one of setting a specific operating mode or recognizing that the specific operating mode is set in an image forming device,
    wherein the predetermined relationship is based on the specific operating mode.

17. The system of claim 16, wherein the operating mode setting interface receives an instruction to set the specific operating mode via a user interface.

18. The system of claim 11, wherein the polynomial function is a higher order polynomial function.

19. The system of claim 11, further comprising:
    at least one data storage unit that stores a plurality of sets of polynomial attributes for different higher order polynomial functions, each set of polynomial attributes including at least a polynomial order and polynomial coefficients; and
    an attribute determining device that determines an order of a polynomial function to be applied as the correction factor and that selects the set of polynomial attributes corresponding to that order polynomial.

20. The system of claim 19, wherein the attribute determining device refers to a specific operating mode of the image forming device to determine the order of the polynomial function.

21. An image forming device including the system of claim 11.

22. A xerographic image forming device including the system of claim 11.

* * * * *